United States Patent [19]

Norton

[11] Patent Number: 4,668,402

[45] Date of Patent: May 26, 1987

[54] SYSTEM FOR TREATING FLUIDS

[75] Inventor: William W. Norton, Lincolnshire, Ill.

[73] Assignee: Culligan International Company, Northbrook, Ill.

[21] Appl. No.: 677,831

[22] Filed: Dec. 3, 1984

[51] Int. Cl.[4] .............................................. B01J 49/00
[52] U.S. Cl. ..................................... 210/662; 210/670; 210/793; 210/98; 210/105; 210/108; 210/140
[58] Field of Search ............... 210/662, 670, 687, 739, 210/89, 98, 102, 103, 108, 109, 140, 143, 190, 191, 269, 275, 791–798, 105; 364/140, 500, 502

[56] References Cited

U.S. PATENT DOCUMENTS

| | | | |
|---|---|---|---|
| 2,240,171 | 4/1941 | Brice et al. | 210/89 |
| 4,426,294 | 1/1984 | Seal | 210/140 |
| 4,470,911 | 9/1984 | Reinke | 210/140 |
| 4,490,249 | 12/1984 | Seal | 210/140 |
| 4,536,845 | 8/1985 | DeVale et al. | 210/140 |

Primary Examiner—Ivars Cintins
Attorney, Agent, or Firm—George H. Gerstman

[57] ABSTRACT

A process and system are provided for treating fluid. In one illustrative embodiment, the treatment comprises the recharging of a resin bed in a water softener. A flow switch and accumulating timer are actuated when a selected flow rate is detected. The accumulating timer is set to a selected elapsed time. A chronological timer is also provided and is set for a selected time of day to recharge the resin bed. A reserve brine capacity is provided by delivering a selected amount of water to a brine tank at predetermined elapsed time intervals of the accumulating timer. The resin bed is recharged when both a selected elapsed time of the accumulating timer has occurred and it is the selected time of day.

27 Claims, 9 Drawing Figures

SYSTEM FOR TREATING FLUIDS

BACKGROUND OF THE INVENTION

The present invention concerns a novel process and system for treating fluid. Although the illustrative embodiments of the invention primarily concern the recharging of a resin bed in a water softener, the present invention is also applicable to fluid treatment including the backwashing of a filter in a water purification system, the removal of selected constituents from water, the adjustment of the concentration of brine in a water softener system, and other fluid treatments which will become apparent from the description.

There are presently several methods of determining when recharging of the resin bed in a water softener is required. In one method, the electrical resistance of the resin bed is determined. The resistance of the resin bed forms one arm of a resistive bridge, and once a selected resistance is determined, recharging is required. Another system for determining whether recharging is required is by using a flow meter. The flow meter is used to determine the amount of water that has been used. Once a selected volume of water has been used as indicated by the flow meter, the system is recharged. However, a flow meter is relatively expensive and needs certain supporting hardware. In addition, certain flow meters are subject to failure as a result of iron and/or turbidity fouling the impellers of the flow meter. The turbine blade is generally formed of plastic material with numerous vanes, and the iron in the water may plate the vanes, eventually forming an obstruction to proper rotation of the turbine.

Another method of determining when recharging should occur is simply to recharge the resin bed every few days. This method can be very wasteful, however, and on the other hand can be too infrequent for various households.

In addition to determining when recharging should occur, when water softeners are concerned one must consider the condition of the brine tank. It is preferable for the brine tank to contain the proper amount of saturated brine solution at the time of recharging. The recharging comprises bathing the resin in brine to remove hardness impurities and then rinsing the resin free of excess brine. Thus, during service the raw water flows into the softener tank, through the tank and out of the tank through a flow switch to the household. The brine tank, which is coupled to the system, is isolated during service. During recharging, the softener tank is backwashed by directing the inlet water to the bottom of the tank through a manifold and then backwashing the ion exchange resin with the water flowing upwardly and out of the softener tank to drain. Brine is then directed from the brine tank to the softener tank, to the manifold and through the softener tank and then to drain. The rinsing step comprises directing the inlet water into the softener tank in the usual manner and washing out the brine to rinse out the tank, although instead of directing the flow from the outlet line to the household, the rinse water flows to drain.

It can be seen that when a water softener is recharged, brine is drawn up from the brine tank into the resin bed of the water softener. After the recharging process is completed, more brine has to be made. It is important that a sufficient saturated brine solution be available at the next recharging time.

I have discovered a novel process and system for recharging the resin in a water softener and my process and system are also useful for other water treatments. In utilizing my invention, there is no need to determine the electrical resistance of the resin bed, nor is the use of a flow meter required in most embodiments of my invention. Further, the problems concomitant with simply recharging a resin bed every few days are alleviated by my process and system. By using my novel fluid treatment process and system, the fluid may be treated when required, at a selected time of day if desired, at a selected day or days of the week, as desired, and in a water softener system a proper volume of saturated brine solution will be available at the time of recharging the resin bed.

SUMMARY OF THE INVENTION

In accordance with the present invention, a process is provided for treating fluid. The process includes the steps of providing a flow switch; adjusting the flow switch to be actuated when a selected flow rate is detected; providing a first timer; coupling the flow switch to the first timer to actuate the first timer when the flow switch is actuated; determining the elapsed time of the first timer; and treating the fluid when a selected elapsed time has occurred.

In the illustrative embodiment, the first timer is deactuated when the flow rate is less than the selected flow rate and the flow switch is deactuated. A chronological timer is also provided. A determination is made from the chronological timer whether it is a selected time of day to treat the fluid. If both the elapsed time has occurred and it is also the selected time of day to treat the fluid, the fluid is treated.

In the illustrative embodiment, a set point timer is also provided. A determination is made whether a selected set point has been reached. If the set point has been reached, the elapsed time of the first timer is determined. The fluid is treated in proportion to the elapsed time of the first timer divided by the selected elapsed time.

In another embodiment of the present invention, a process is provided for recharging a resin bed in a water system. The process includes the steps of providing a flow switch; adjusting the flow switch to be actuated when a selected flow rate is detected; providing a first timer; setting the first timer to a selected elapsed time; coupling the flow switch to the first timer to actuate the first timer when the flow switch is actuated; providing a chronological timer; delivering a selected amount of water to a brine tank at predetermined elapsed time intervals of the first timer; determining from the chronological timer whether it is a selected time of day to recharge the resin bed; determining the elapsed time of the first timer; and recharging the resin bed when both a selected elapsed time has occurred and it is the selected time of day.

A more detailed explanation of the invention is provided in the following description and claims, and is illustrated in the accompanying drawings.

DETAIL DESCRIPTION OF THE ILLUSTRATIVE EMBODIMENTS

Figure 1:
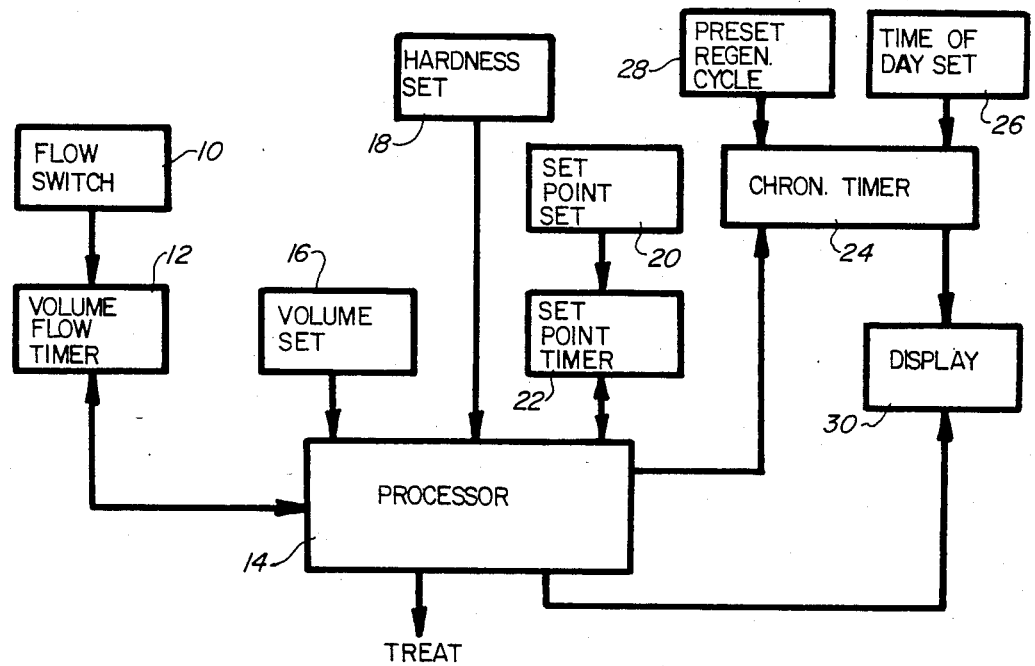
FIG. 1 is a block diagram of a fluid treatment system in accordance with the principles of the present invention.

Referring to FIG. 1, a fluid treatment system is shown therein in which a flow switch 10 is coupled to the outlet line, for example, from a water softener, a filter in a water purification system, or any other outlet line from a device that has to be treated by adding or removing chemicals, backwashing, removing constituents, adjusting certain parameters, etc. Thus the present invention is applicable to any fluid system in which there is a need to recharge or rejuvenate or adjust or remove once a certain volume of fluid flow has occurred.

Flow switch 10 is coupled to a first timer 12 which is a volume flow timer operating to accumulate time once it is actuated by flow switch 10. Volume flow timer 12 is coupled to a processor 14, which may be a microprocessor in a microprocessor-based system or may be another electrical or electromechanical or mechanical device if appropriate.

Flow switch 10 is adjustable so that it is adapted to be adjusted for actuation once a selected flow rate is detected. Thus once the selected flow rate is detected, flow switch 10 will become actuated to actuate volume flow timer 12.

A volume set switch 16 is coupled to processor 14. This sets the volume that will be accumulated when the treatment is necessary. However, instead of using a volumetric flow meter, volume flow timer 12 is calibrated to approximate volume accumulated. For example, if the system of FIG. 1 is used for recharging a water softener, flow switch 10 may be adjusted for actuation when there is a flow rate of two gallons per minute (gpm) or more. In this manner, volume flow timer 12 will become operative to accumulate time once flow switch 10 is actuated. By adjusting volume set 16, the volume flow timer will be set to a selected elapsed time. For example, if the volume is set to 2,000 gallons of water, processor 14 will operate volume flow timer 12 so as to set volume flow timer 12 to a selected time of 1,000 minutes. Once 1,000 minutes has been accumulated by volume flow timer 12, a signal will be transmitted to processor 14 to recharge the resin bed of the softener. It has been found that the use of a volume flow timer provides an approximate volume usage determination, without requiring the use of a flow meter having turbine blades and the problems concomitant therewith.

A hardness set switch 18 is also coupled to processor 14 in order for the operator to set the desired hardness of the water to be softened. Also coupled to processor 14 is a set point set switch 20 and a set point timer 22. The set point timer provides a maximum time period between recharging of the resin bed. For example, if it is desired to recharge the resin bed at least once every 24 hours, whether there is sufficient volume demand or not, the set point set switch 20 is operated to set the set point timer to 24 hours or 1,440 minutes. After each recharging cycle, the processor will determine whether 1,440 minutes have elapsed without the volume flow timer reaching the selected time and, if the 1,440 minute set point has been reached, the resin bed will be recharged.

However, it is usually desirable that the water softener be recharged only during periods of non-use. To this end, a chronological timer 24 is provided. There is coupled to the chronological timer a time of day set switch 26, which may be set for a time of minimum water usage, such as 2:00 a.m. Also connected to chronological timer 24 is a preset regeneration cycle circuit 28, for presetting a recharging cycle, for example, for every three days. Thus with chronological timer 24 set for 2:00 a.m. and preset regeneration cycle circuit 28 set for a three-day setting, processor 14 will be signaled to recharge the resin bed at 2:00 a.m. every three days.

The chronological timer 24 and processor 14 is coupled to a display 30 for displaying data such as present time, the predetermined time that is set for recharging, the preset recharging cycle period, volume setting, hardness setting, set point setting, etc.

The demand system including the flow switch 10, volume flow timer 12 and volume set switch 16 may be combined with the maximum interval system including the set point set switch 20 and the set point timer 22, and may also be combined with the time of day system including the time of day set switch 26, chronological timer 24 and preset regeneration cycle circuit 28. As can be more readily understood from the flow charts described below, the demand, maximum interval and time of day systems may operate independently or in conjunction with each other.

Figure 2:
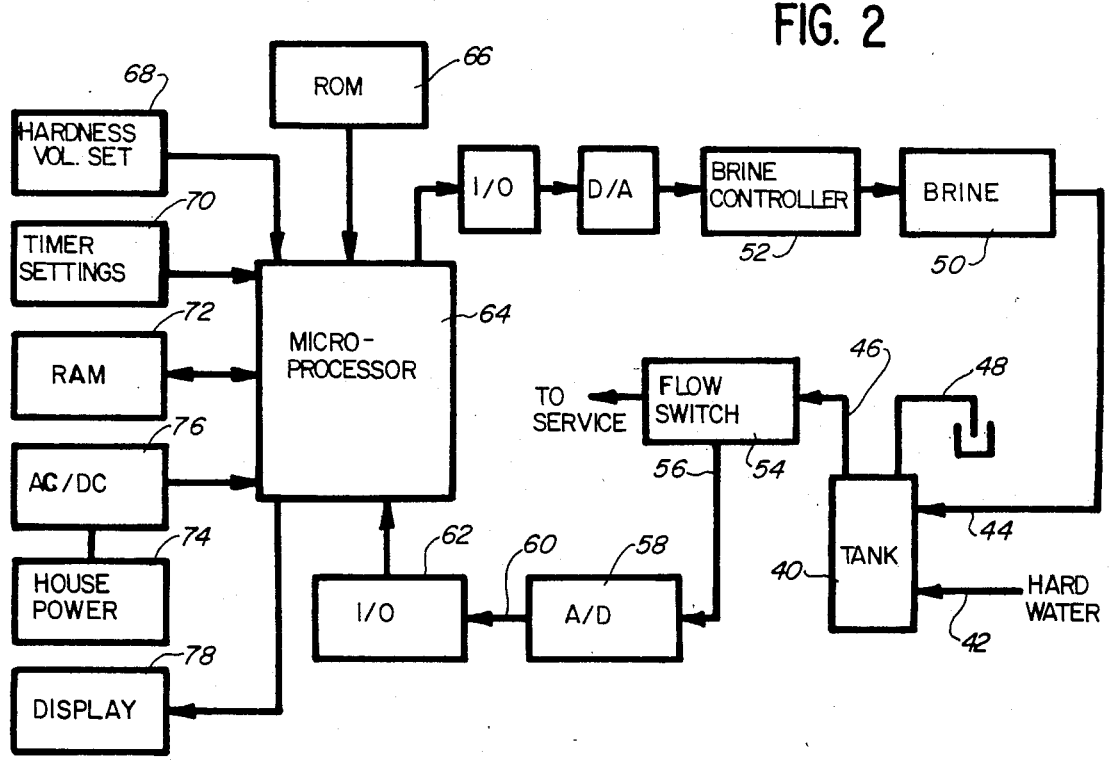
FIG. 2 is a block diagram of a water softener recharging system in accordance with the principles of the present invention.

Referring to FIG. 2, a water softener system is shown therein comprising a softener tank 40 containing a bed of ion exchange resin, a hard water inlet 42, a brine inlet 44, a water outlet 46, and a drain 48. A brine tank 50 is coupled to the brine inlet 44 of tank 40. Brine tank 50 includes a saturated brine solution that is controlled in accordance with brine controller 52. Brine controller 50 is operative to adjust the concentration of brine delivered to softener tank 40 or to deliver a certain amount or amounts of water to the brine tank at predetermined intervals. The system is controlled in response to approximated volume usage of water flowing via line 46. The approximated volume is determined in the aforesaid manner in which a flow switch, which is actuated when a selected flow rate is detected, operates an accumulating timer. In FIG. 2, flow switch 54 is connected in line 46 and provides an analog signal in response to flow in line 46. The signal is transmitted via line 56 to an analog to digital converter 58 from where it is transmitted via line 60 to an input/output port 62 of a microprocessor 64. Flow switch 54 may be a digital flow switch, not requiring analog to digital converter 58. An appropriate program for microprocessor 54 is contained within ROM 56. Hardness and volume set switches 68 are coupled to microprocessor 64 and timer setting 70 are also coupled to microprocessor 64. Microprocessor 64 operates with RAM 72 and is powered by household power 74 which is connected to an AC to DC converter 76. The microprocessor provides indicia of operating parameters on display 78.

The output of the microprocessor from input/outpot port 80 is transmitted via line 82 to a digital to analog converter 84 for feeding an analog signal via line 86 to brine controller 52. In a specific example, the microprocessor includes a digital counter which is operable to begin counting once flow switch 54 senses a flow that is greater than two gpm. The flow signal is provided on line 56, translated to a digital signal which is provided to the microprocessor at input/output port 62. Once microprocessor 64 senses that a flow of greater than two gpm has been provided, the digital counter will increment. However, when the flow is sensed to be less than two gpm the digital counter will cease counting. The digital counter has been set by volume setting switch 68 so that once a certain count is reached, a signal will be presented via line 82 to provide an analog signal on line 86 for operating brine controller 52. The analog signal is responsive to the hardness setting fed to the microprocessor from switch 68. Timer setting switch 70 is operative to program the microprocessor so that even though demand for recharging has been completed because the digital counter has reached a selected count for recharging, recharging will not occur until it is a certain time of day, for example, 2:00 a.m. Further, the timer setting switch 70 may be used to program the microprocessor so that in addition to a chronological and demand function, it also has a set point function whereby after a predetermined time from a previous recharging, another recharging will occur. For example, the timer setting switch 70 may be set so that recharging will occur every 24 hours, whether there is recharging demand or not.

Figure 3:
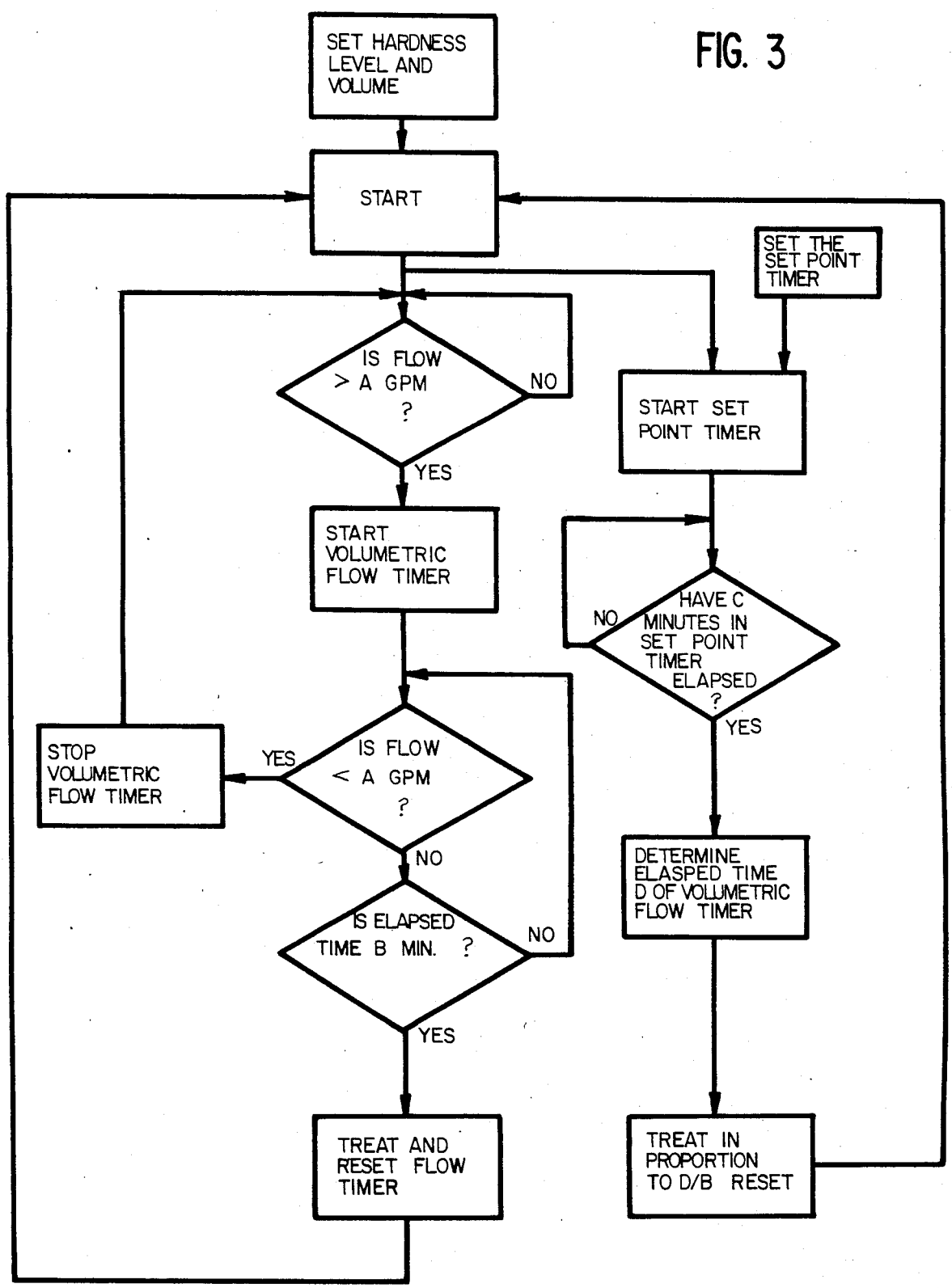
FIG. 3 is a flow chart of a fluid treatment process in accordance with one embodiment, based upon demand or maximum interval.

In FIG. 3 a flow chart is presented showing a treatment mode in which treatment occurs on demand or maximum interval. Referring to FIG. 3, the hardness level and volume setting is made, and the set point timer is set. The process commences and the set point timer is started. A determination is made whether the water flow is greater than a selected amount, which in FIG. 3 is A gpm. If it is determined that the flow is greater than A gpm, the volumetric flow timer starts. During operation of the volumetric flow timer, determination is made whether the flow is less than A gpm. If so, the volumetric flow timer is stopped. If the flow continues to be greater than A gpm, a determination is made whether the elapsed time on the volumetric flow timer is a selected elapsed time. The selected elapsed time in FIG. 3 is B minutes. If the elapsed time is B minutes, the water is treated and the cycle is repeated.

During the cycle, a determination is made whether a selected time of the set point timer has elapsed. In FIG. 3, the selected set point time is C minutes. If C minutes have not elapsed on the set point timer, the process continues. However, if C minutes have elapsed, a determination is made with respect to the elapsed time of the volumetric flow timer at the time that C minutes in the set point timer have elapsed. The time D of the volumetric flow timer which has elapsed at the time that C minutes in the set point timer have elapsed is used for treating the water in proportion to D divided by B. As an example, if C is 1,440 minutes and B is 1,000 minutes, and if at the time C has occurred the elapsed time D of volumetric flow timer is 700 minutes, the water will be treated in proportion to 700 divided by 1,000 or 70 percent of the treatment that would occur if the volumetric flow timer had timed out prior to C minutes in the set point timer elapsing. If the fluid treatment process is used in connection with a water softening system, the brine valve may be opened for 70 percent of the time that it would be opened if full recharging were required to deliver 70 percent of the brine solution that would be delivered if full recharging were delivered.

Figure 4:
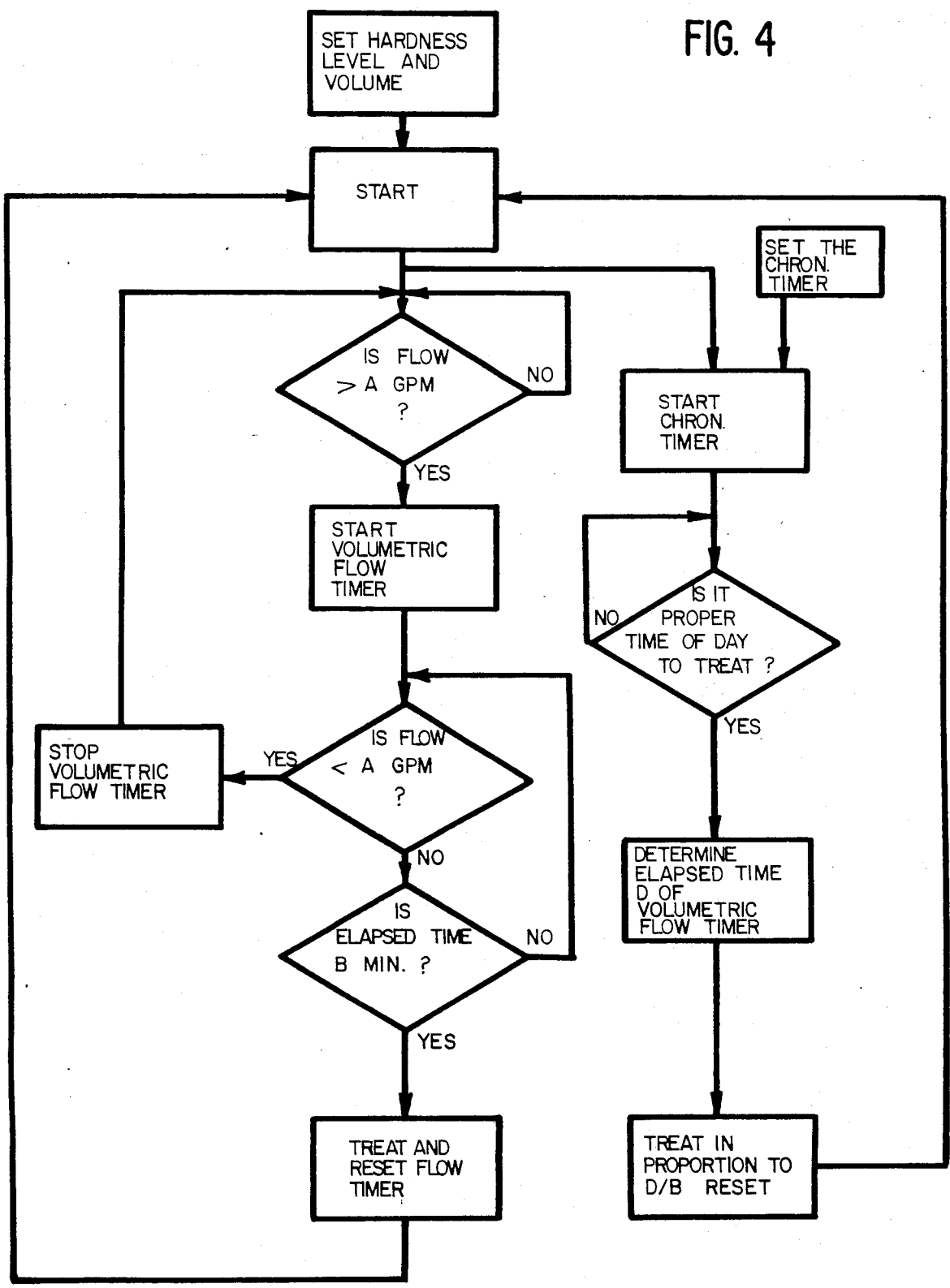
FIG. 4 is a flow chart of a fluid treatment process according to another embodiment, based upon demand or time of day.

In FIG. 4, a process is shown that is responsive to demand or time of day. Referring to FIG. 4, it can be seen that a chronological timer is set. When the cycle begins, the chronological timer starts. A determination is made whether it is the proper time of day to treat the water. If it is the proper time of day to treat the water, the elapsed time of the volumetric flow timer is determined and the water is treated in proportion to the elapsed time D of the volumetric flow timer divided by the selected elapsed time B of the volumetric flow timer. This process would be used if one wishes to treat the water, such as by recharging a water softener, every day at 2:00 a.m.

Figure 5:
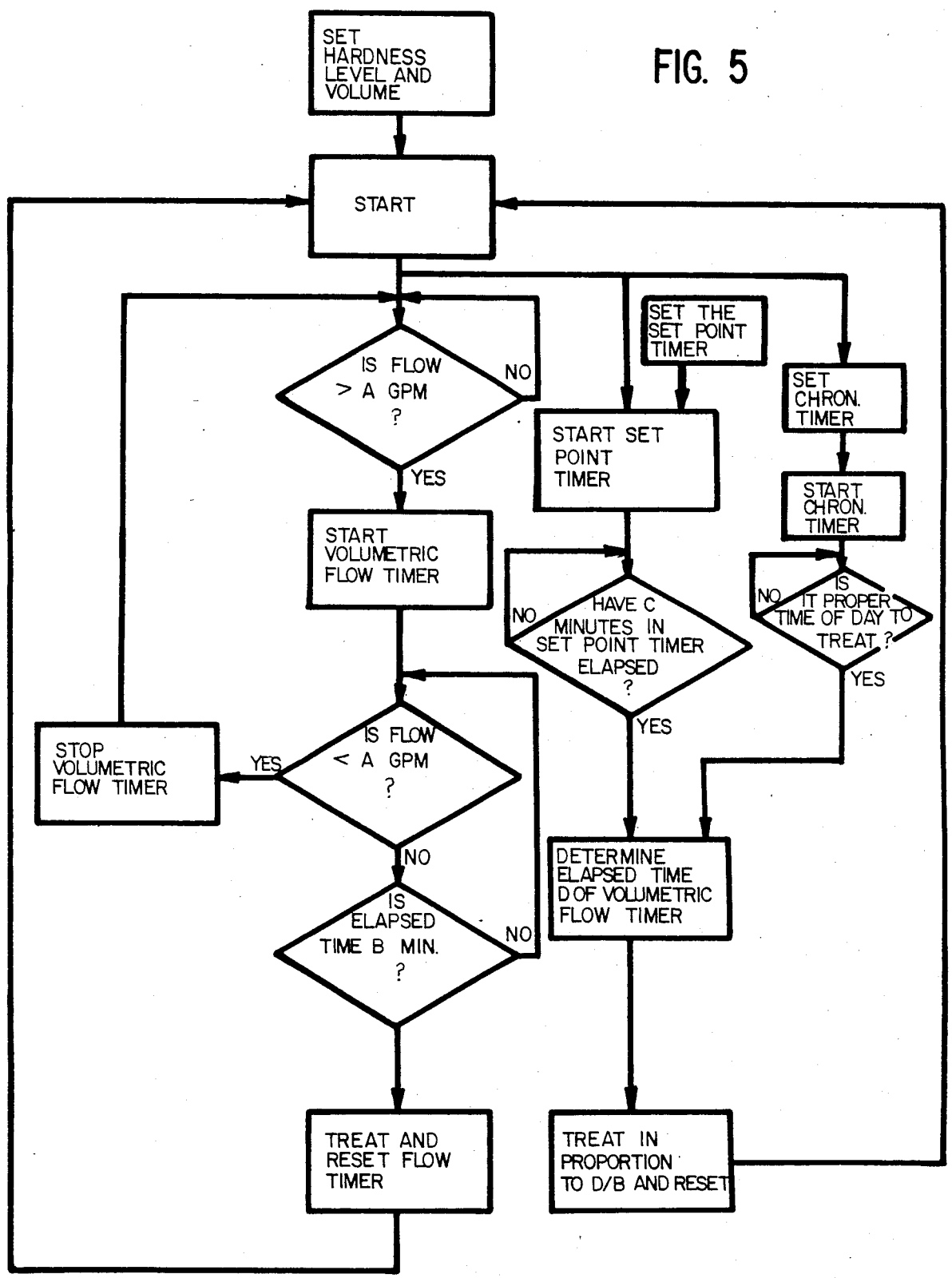
FIG. 5 is a flow chart of a fluid treatment process, in accordance with another embodiment, responsive to demand or maximum interval plus time of day.

In FIG. 5, a treatment process is illustrated in which the demand system is combined with a maximum interval system and also a time of day system. This mode combines the processes of FIGS. 3 and 4.

Figure 6:
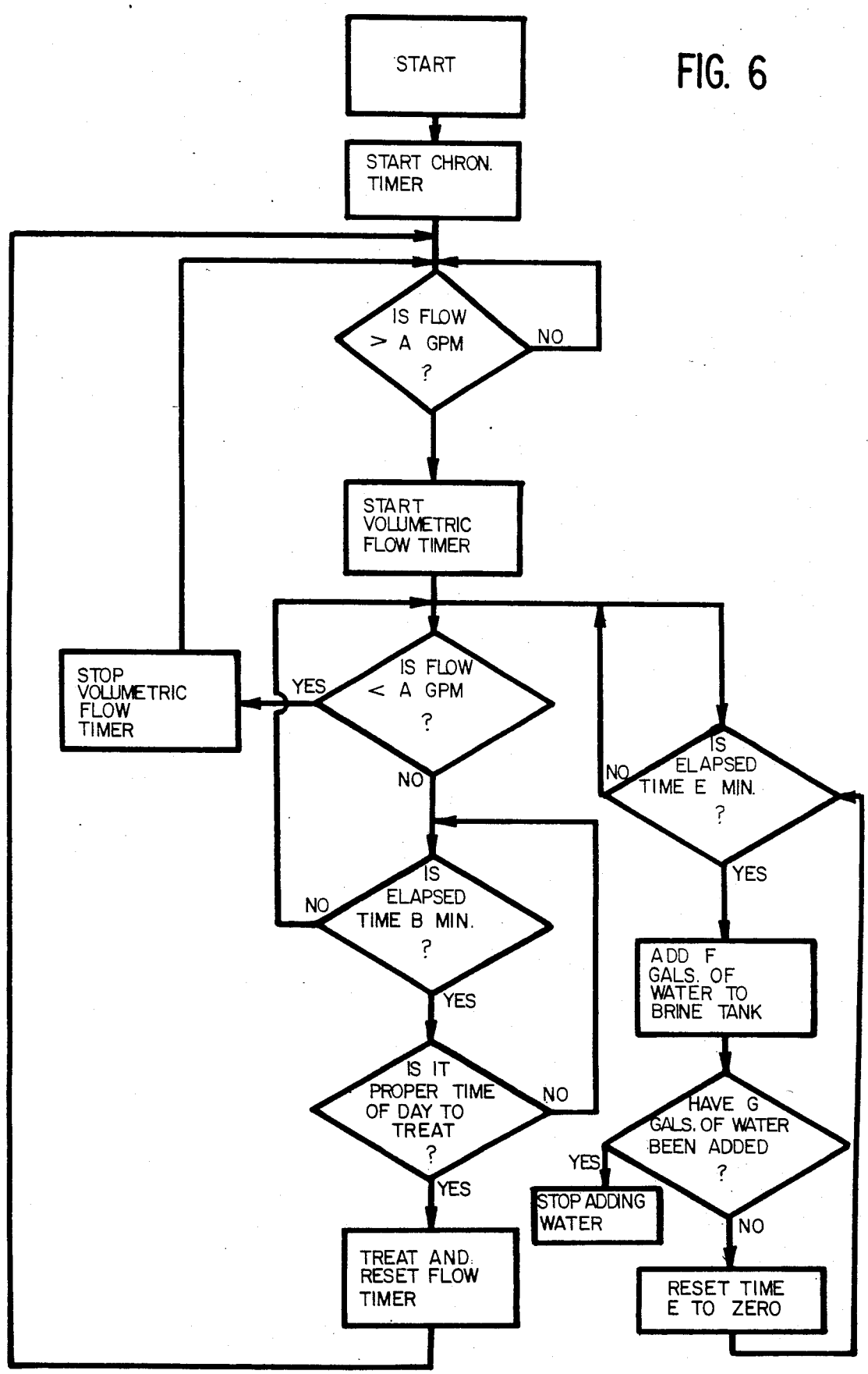
FIG. 6 is a flow chart of a water softener recharging process in accordance with another embodiment, responsive to demand and time of day.

In FIG. 6, a flow chart for a treatment process is illustrated in which a chronological timer is set and after demand has been met, recharging will not occur until a predetermined time of day. Thus after the selected elapsed time of B minutes of the volumetric flow timer has been completed, a determination is made as to whether it is the proper time of day to treat. Only if both the elapsed time B has been reached and it is the proper time of day to treat, will treating commence. Thus, in a softening system, not only must the volumetric flow timer count the selected time B minutes, but it must also be the proper time, such as 2:00 a.m., before the softener is commanded to recharge. This is called demand delayed recharging.

In accordance with this embodiment of the present invention, the selected time of B minutes is less than the time required for a full capacity recharging. For example, assume that a 3,000 gallon capacity softener should be completely recharged after 1,500 minutes of elapsed time, with the 1,500 minutes of elapsed time being considered equivalent to 3,000 gallons of water usage. Also assume that it is desirable to recharge only at the proper time, such as 2:00 a.m. It has been found to be desirable that the system is recharged only at a proper time of day, for example, 2:00 a.m., and also only if a selected volume of water has been used. In a system wherein 3,000 gallons of water usage requires capacity recharging, it may be desirable to recharge after only 1,500 gallons of water usage. However, if there has only been a portion of water usage, for example, 1,500 gallons instead of the full 3,000 gallons required for capacity recharging, there is no need to use the same amount of brine for the 1,500 gallon usage that would be used for the 3,000 gallon usage. Thus, in this embodiment of the present invention, the system operates to use only the amount of brine required based upon water usage.

To understand this system, reference is made to FIG. 6. In FIG. 6, a chronological timer is started and the softener will be recharged only at the proper time of day, for example, 2:00 a.m. A determination is made as to whether the flow is greater than A gallons per minute, wherein A may be two. As long as the flow is greater than A gallons per minute, the volumetric flow timer will continue to increment. A determination is made with respect to the volumetric flow timer as to whether the selected time of B minutes has elapsed. In this embodiment, B is selected to be less than the total time that would elapse if the system needed capacity recharging. For example, if the system needs capacity recharging once 1,500 minutes has elapsed, then the selected time B may be equal to 750 minutes. In this manner, the softener will be recharged if there have been two occurrences: (1) there has been an elapsed time of 750 minutes, and (2) it is 2:00 a.m.

Now assume that it takes G gallons of water, added to the brine tank, to make the necessary amount of brine for capacity recharging of 3,000 gallons of water usage or 1,500 minutes of elapsed time. If there has been only 750 minutes of water usage at 2:00 a.m., there is no need to have used that much brine. In other words, there is no need to have used G gallons of water. Therefore, in accordance with this embodiment of the present invention, at predetermined elapsed time intervals of E minutes, only a fraction of the total amount of water needed is added to the brine tank. For example, after each 100 minutes of water usage, only 1/15th of the capacity amount of water (G) that would normally be added to the brine system (which is initially dry) will be added. Thus an elapsed time of E minutes is determined, with E equaling 100, for example. Every time that E minutes elapse, F gallons of water will be added to the brine tank. In this example, F may be equal to 1/15th G. Once G gallons of water have been added, the brine is complete and no further water will be added.

Referring again to FIG. 6, assume that B minutes has elapsed. Thus 750 minutes has elapsed. Assume, however, that it is 9:00 p.m. and thus it is not yet the proper time of day to recharge. At the time that B minutes has elapsed, there will have been seven slugs of water (7 X F) added to the brine tank because every hundred minutes a slug F of water will be added to the brine tank. Now assume that between 9:00 p.m. and 2:00 a.m. there is an additional 450 minutes of elapsed time. This will mean that by the time that 2:00 a.m. occurs, there has been 1,100 minutes of elapsed time. Since there has been 1,100 minutes of elapsed time, there have been 11 slugs of water (11 X F) added to the brine tank. Under no circumstances will there by more than 15 slugs of water added to the brine tank because 15 slugs equals G gallons and the system will stop adding water to the brine tank once G gallons of water have been added.

Figure 7:
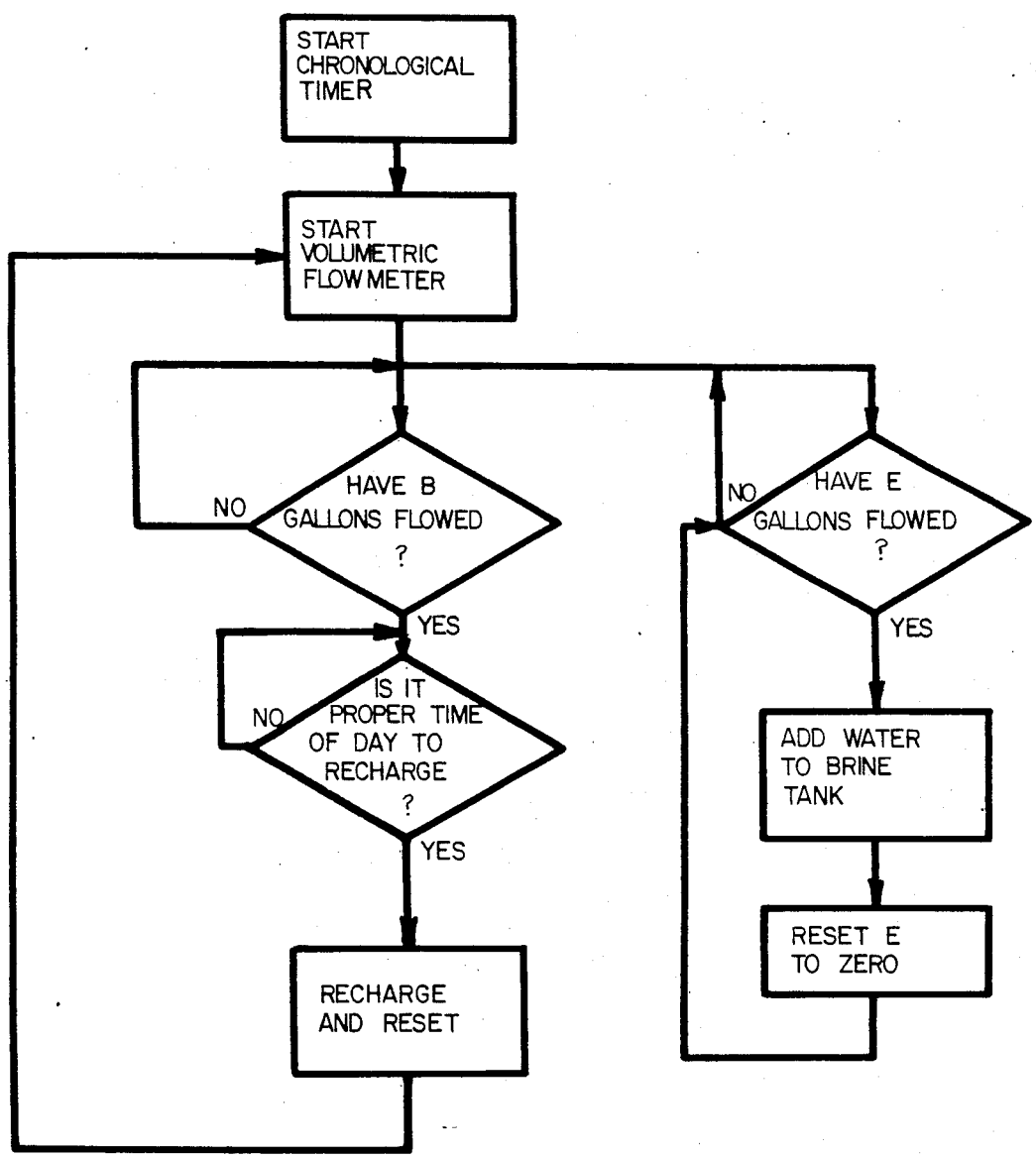
FIG. 7 is a flow chart of a water softener recharging process in accordance with another embodiment in which a flow meter is used, responsive to demand and time of day.

FIG. 7 shows a system that is similarin certain respects to the system of FIG. 6, but in the FIG. 7 system a volumetric flow meter is used instead of using a volumetric flow timer. Thus a determination is made as to whether B gallons have flowed. If B gallons have flowed and it is the proper time of day to recharge, the softener is recharged. As with FIG. 6, B gallons may be selected to be only a portion of the total amount of gallons which would flow to require a full recharging. Like FIG. 6, water is added to the brine tank in slugs according to predetermined time intervals of flow. As an example, assume that 3,000 gallons of flow would require total recharging. Assume further that B is selected to be 1,500 gallons and 2:00 a.m. is selected as the proper time of day to recharge. Also assume that E is selected to be 200 gallons. Each slug of water to be added to the brine tank equals 1/15th of the total amount of water that would normally be added to the brine tank (which is initially dry). Thus once the volumetric flow meter is operating, every time that 200 gallons flow, a slug of water is added to the brine tank. Once 1,500 gallons of water have flowed and it is 2:00 a.m., the softener will be recharged. Only the necessary amount of brine will be used because if at 2:00 a.m., 2,000 gallons of water have flowed, only 10 slugs of water will have been added to the brine tank. Likewise, if 2,400 gallons of water have flowed when 2:00 a.m. occurs, 12 slugs of water will have been added to the brine tank. On the other hand, if only 1,000 gallons of water have flowed by the time 2:00 a.m. arrives, five slugs of water will have been added to the brine tank but there will be no recharging of the softener because the selected volume B is equal to 1,500 gallons and that amount has not yet flowed. Once 1,500 gallons of water have flowed, however, the softener will be recharged at the next occurrence of 2:00 a.m.

Figure 8:
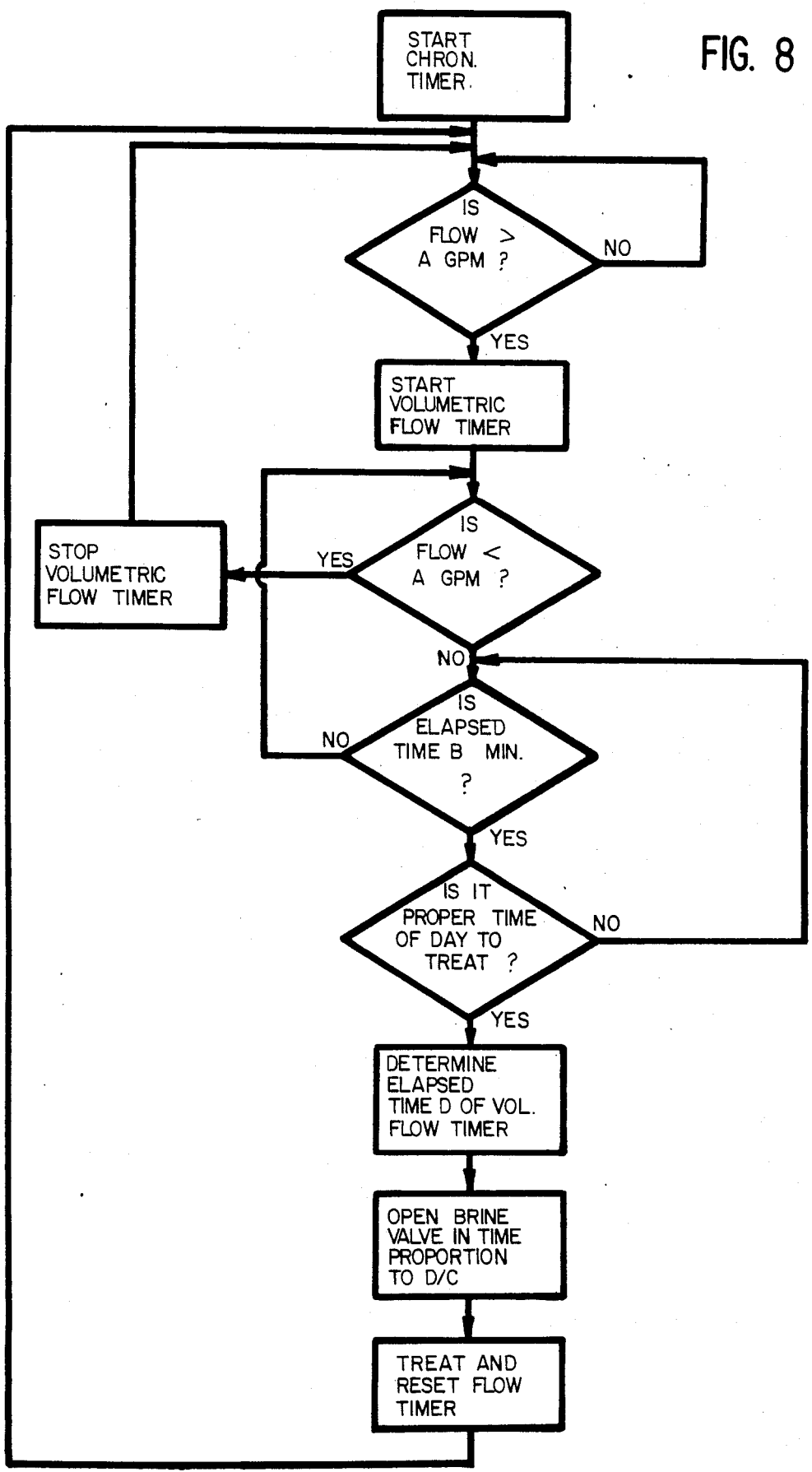
FIG. 8 is a flow chart of a water softener recharging process in accordance with another embodiment, response to demand and time of day and enabling proportional brining.

Another manner of providing brine is to keep the brine chamber full at all times and to vary the concentration of the brine solution delivered to the softener as a function of expended capacity. This is illustrated in FIG. 8. Assume that the softener has a 1,500 minute capacity (C) and that only one-half of that capacity (750 minutes-B) has been used by 2:00 a.m. when the system is scheduled for regeneration. To this end, a proportioning timer would open the brine valve just long enough to deliver one-half of the saturated brine. In other words, a proportioning timer would be used to open the brine valve for a time that is proportional to the fraction of the total capacity (C) that has been used. If the full 1,500 minute capacity has been used by 2:00 a.m., the proportioning timer would open the brine valve long enough to deliver all of the saturated brine. On the other hand, if only 60 percent of that capacity has been used by 2:00 a.m., the proportioning timer would open the brine valve just 60 percent of the time that it would be open to deliver the full amount of saturated brine. This embodiment can be readily understood by referring to FIG. 8 in which the brine valve is opened in proportion to D over C wherein C is the selected time of full capacity recharging and D is the actual elapsed time which may constitute less than the full capacity elapsed time C.

Figure 9:
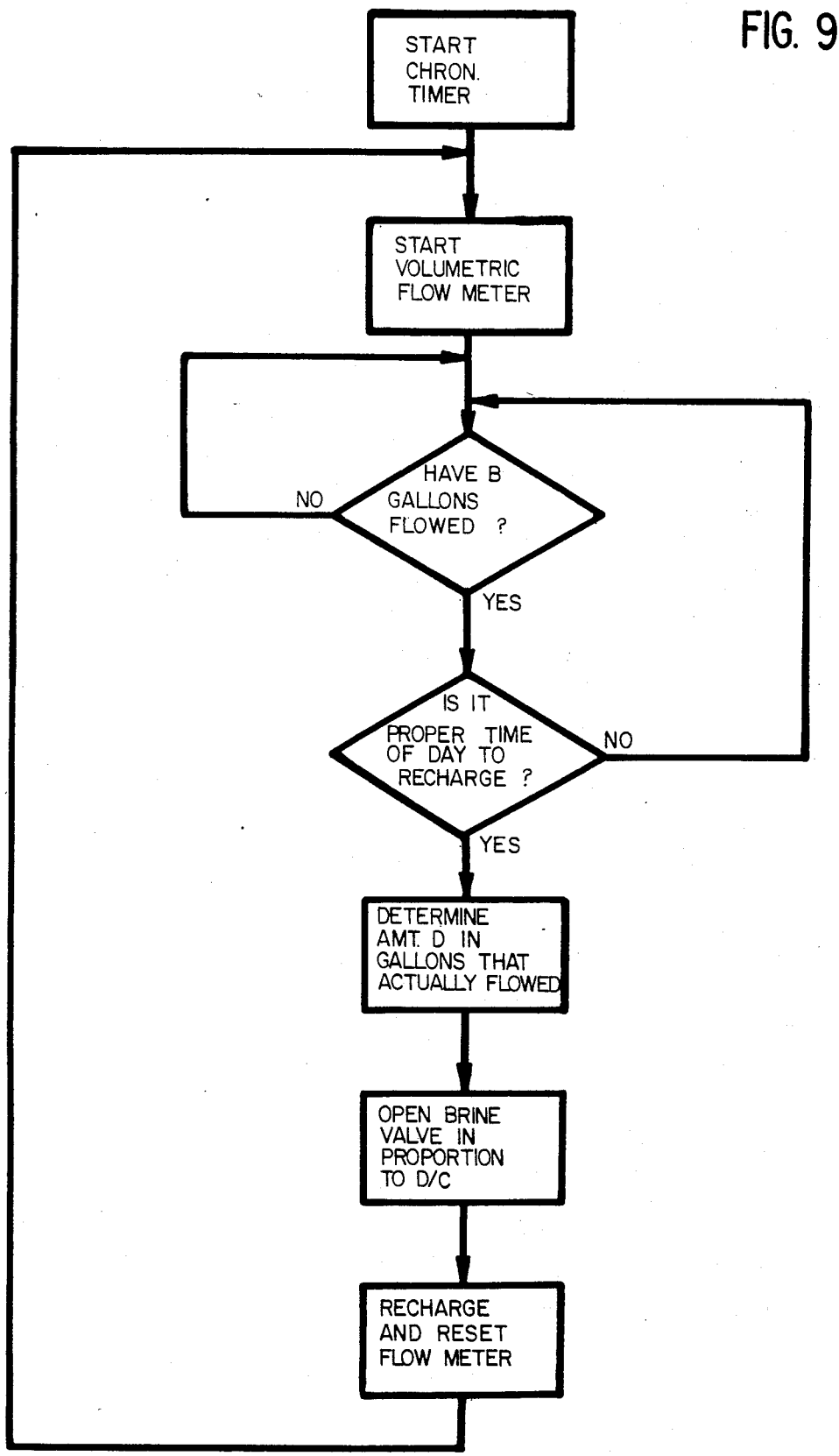
FIG. 9 is a flow chart of a water softener recharging process in accordance with a further embodiment in which a flow meter is used, responsive to demand and time of day and enabling proportional brining.

In FIG. 9 a system is shown that operates similarly to the system of FIG. 8 in that the brine valve is opened in time proportion to the actual volume of water used as compared with total capacity. In the FIG. 8 embodiment, however, a volumetric flow meter is used to determine the actual amount of water that has been used. Thus it will be assumed that the softener has a capacity of 3,000 gallons and may be recharged only at 2:00 a.m. if at least 1,500 gallons have flowed. Using this assumption, B is equal to 1,500 and C is equal to 3,000. If 2:00 a.m. arrives and only 1,000 gallons have flowed, there will be no recharging. However, if at 2:00 a.m. the next morning 1,500 gallons have flowed, the brine valve will be opened to permit eduction of 1,500/3,000 or 50 percent of the full amount of brine for capacity and recharging will then occur. If at 2:00 a.m. 2,000 gallons have flowed, then D is equal to 2,000 and the brine valve will open for two-thirds of the time that it would normally be open to allow two-thirds of the brine to be educated for recharging.

It can be seen that a process and system has been provided which obviate the need for testing the resistance of the bed in order to determine when recharging is needed. In addition, the process and system of most embodiments use a timer concept instead of a flow meter having the problems concomitant with turbine blades and the present process and system is versatile to allow for demand regeneration, without delay, demand delayed regeneration and for providing a reserve brine capacity.

Although illustrative embodiments of the invention have been shown and described, it is to be understood that various modifications and substitutions may be made without departing from the novel spirit and scope of the present invention.

What is claimed is:

1. In a process for treating fluid with a water softening material or a filtering material, a process for rejuvenating the water softening material or the filtering material in the absence of a flow meter, including the steps of:
   providing a flow switch which will be actuated only when a selected flow rate of the fluid is detected;
   providing a first timer;
   coupling the flow switch to the first timer to actuate the first timer only when the flow switch is actuated;
   determining the elapsed time of the first timer whereby a volume flow measurement is simulated; and
   rejuvenating the water softening material or the filtering material in response to a signal generated by the first timer when a selected elapsed time has occurred, whereby the use of a flow meter is obviated.

2. A process as described in claim 1, including the step of deactuating the first timer when the flow rate is less than the selected flow rate and the flow switch is deactuated.

3. A process as described in claim 1, including the steps of providing a chronological timer;
   determining whether it is a selected time of day to rejuvenate the water softening material or the filtering material;
   rejuvenating the water softening material or the filtering material when both the selected elapsed time has occurred and it is the selected time of day to rejuvenate the water softening material or the filtering material.

4. A process as described in claim 1, wherein said first timer comprises one of a clock and a digital counter.

5. A process as described in claim 1, including the steps of providing a set point timer;
   determining whether a selected set point has been reached; and
   if the set point has been reached, then determining the elapsed time of the first timer and rejuvenating the water softening material or the filtering material in proportion to the elapsed time of the first timer divided by said selected elapsed time.

6. A process as described in claim 1, including the steps of providing a chronological timer;
   determining whether it is a selected time of day to treat the fluid;
   if it is the selected time of day to treat the fluid, then determining the elapsed time of the first timer and rejuvenating the water softening material or the filtering material in proportion to the elapsed time of the first timer divided by the selected elapsed time.

7. A process as described in claim 1, including the steps of providing a set point timer;
   determining whether a selected set point has been reached; and
   if the set point has been reached, then determining the elapsed time of the first timer and rejuvenating the water softening material or the filtering material in proportion to the elapsed time of the first timer divided by said selected elapsed time.

8. A process as described in claim 7, including the step of deactuating the first timer when the flow rate is less than the selected flow rate and the flow switch is deactuated.

9. A process as described in claim 1, wherein said rejuvenation comprises the recharging of a resin bed in a water softener.

10. A process as described in claim 1, wherein said rejuvenation comprises backwashing a filter in a water purification system.

11. A process as described in claim 1, wherein said rejuvenation comprises adjusting the concentration of brine in a water softener system.

12. A process as described in claim 1, including the steps of providing a chronological timer;
    determining whether it is a selected time of day to rejuvenate the water softening material or the filtering material;
    rejuvenating the water softening material or the filtering material if either the selected elapsed time has occurred or it is the selected time of day to rejuvenate the water softening material or the filtering material.

13. A process for recharging a resin bed in a water system in the absence of a flow meter, including the steps of:
    providing a flow switch which will be actuated when a selected flow rate is detected;
    providing a first timer;
    setting the first timer to a selected elapsed time;
    coupling the flow switch to the first timer to actuate the first timer only when the flow switch is actuated;
    providing a chronological timer;
    delivering a selected amount of water to a brine tank at predetermined elapsed time intervals of said first timer;
    determining from the chronological timer whether it is a selected time of day to recharge the resin bed;
    determining the elapsed time of the first timer whereby a volume flow measurement is simulated; and
    recharging the resin bed in response to signals from said first timer and said chronological timer when both a selected elapsed time has occurred and it is said selected time of day.

14. In a system for treating fluid with a water softening material or a filtering material, apparatus for rejuvenating the water softening material or the filtering material in the absence of a flow meter, which comprises:
    a flow switch adapted for actuation only when a selected flow rate is detected;
    a first timer adapted to be set to a selected elapsed time;
    means coupling the flow switch to the first timer to actuate the first timer only when the flow switch is actuated;

means for determining the elapsed time of the first timer whereby a volume flow measurement is simulated; and means for rejuvenating the water softening material or the filtering material in response to a signal generated by the first timer when a selected elapsed time has occurred, whereby the use of a flow meter is obviated.

15. A system as described in claim 14, including means for deactuating the first timer when the flow rate is less than the selected flow rate.

16. A system as described in claim 14, including a chronological timer;

means for determining whether it is the selected time of day to rejuvenate the water softening material or the filtering material; and means for rejuvenating the water softening material or the filtering material when both the selected elapsed time has occurred and it is said selected time of day to rejuvenate the water softening material or the filtering material.

17. A system as described in claim 14, wherein said first timer comprises one of a clock and a digital counter.

18. A system as described in claim 14, including a set point timer adapted to be set to a selected set point;

means for determining whether the selected set point has been reached; and means operable in response to the reaching of the set point for rejuvenating the water softening material or the filtering material in proportion to the elapsed time of the first timer divided by said selected elapsed time.

19. A system as described in claim 14, including a chronological timer adapted to be set to a selected treatment time of day;

means for determining when said selected treatment time of day has occurred; and means operable in response to the occurrence of said selected treatment time of day for rejuvenating the water softening material or the filtering material in proportion to the elapsed time of the first timer divided by said selected elapsed time.

20. A system as described in claim 19, including a set point timer adapted to be set to a selected set point;

means for determining whether the selected set point has been reached; and means operable in response to the reaching of the set point for rejuvenating the water softening material or the filtering material in proportion to the elapsed time of the first timer divided by said selected elapsed time.

21. A system as described in claim 14, wherein said rejuvenation comprises the recharging of a resin bed in a water softener.

22. A system as described in claim 14, wherein said rejuvenation comprises backwashing a filter in a water purification system.

23. A system as described in claim 14, wherein said rejuvenation comprises adjusting the concentration of brine in a water softener system.

24. A system for recharging a resin bed in a water softener in the absence of a flow meter, comprising:

an adjustable flow switch adapted for actuation only when a selected flow rate is detected;

a first timer adapted to be set to a selected elapsed time;

means coupling the flow switch to the first timer to actuate the first timer only when the flow switch is actuated;

a chronological timer;

means for determining when it is a selected time of day to recharge;

means for determining the elapsed time of the first timer whereby a volume flow measurement is simulated; and means for recharging in response to signals from said first timer and said chronological timer when both the selected elapsed time has occurred and it is said selected time of day to treat the fluid.

25. A system for recharging the resin bed in a water softener in the absence of a flow meter, comprising:

an adjustable flow switch for actuation only when a selected flow rate is detected;

a first timer adapted to be set to a selected elapsed time;

means coupling the flow switch to the first timer to actuate the first timer only when the flow switch is actuated;

a chronological timer;

means for delivering a selected amount of water to a brine tank at predetermined elapsed time intervals of said first timer;

means for determining from said chronological timer whether it is the selected time of day to recharge the resin bed;

means for determining the elapsed time of the first timer whereby a volume flow measurement is simulated; and means for recharging the resin bed in response to signals from said first timer and said chronological timer when both the selected elapsed time has occurred and it is the selected time of day.

26. A process for recharging a resin bed in a water softening system in the absence of a flow meter, including the steps of:

providing a flow switch which is actuated only when a selected flow rate is detected;

providing a first timer;

coupling the flow switch to the first timer to actuate the first timer only when the flow switch is actuated;

providing a chronological timer;

determining from the chronological timer whether it is a selected time of day to recharge the resin bed;

determining the elapsed time of the first timer whereby a volume flow measurement is simulated;

if both a selected elapsed time has occurred and it is said selected time of day, then providing an amount of brine in proportion to the actual elapsed time divided by the maximum capacity elapsed time; and recharging the resin bed.

27. In a process for treating fluid with a water softening material, a process for rejuvenating the water softening material in the absence of a flow meter, including the steps of:

providing a flow switch which will be actuated only when a selected flow rate of the fluid is detected;

providing a first timer;

setting the first timer to a selected elapsed time;

coupling the flow switch to the first timer to actuate the first timer only when the flow switch is actuated;

providing a chronological timer;

providing a predetermined capacity of treatment media at predetermined elapsed time intervals of said first timer;

determining from said chronological timer whether it is a selected time of day to rejuvenate the water softening material;

determining the elapsed time of the first timer whereby a volume flow measurement is simulated; and rejuvenating the water softening material in response to signals generated by the first timer and the chronological timer when both said selected elapsed time has occurred and it is said selected time of day.

* * * * *